United States Patent
Guo et al.

(10) Patent No.: US 12,417,335 B2
(45) Date of Patent: Sep. 16, 2025

(54) MULTI-STAGE FPGA ROUTING METHOD FOR OPTIMIZING TIME DIVISION MULTIPLEXING

(71) Applicant: FUZHOU UNIVERSITY, Fujian (CN)

(72) Inventors: Wenzhong Guo, Fujian (CN); Genggeng Liu, Fujian (CN); Guolong Chen, Fujian (CN)

(73) Assignee: FUZHOU UNIVERSITY, Fujian (CN)

( * ) Notice: Subject to any disclaimer, the term of this patent is extended or adjusted under 35 U.S.C. 154(b) by 505 days.

(21) Appl. No.: 17/776,246

(22) PCT Filed: Sep. 30, 2020

(86) PCT No.: PCT/CN2020/119328
§ 371 (c)(1),
(2) Date: May 12, 2022

(87) PCT Pub. No.: WO2021/169303
PCT Pub. Date: Sep. 2, 2021

(65) Prior Publication Data
US 2022/0398373 A1 Dec. 15, 2022

(30) Foreign Application Priority Data
Feb. 28, 2020 (CN) .......................... 202010126180.3

(51) Int. Cl.
*G06F 30/398* (2020.01)
*G06F 30/394* (2020.01)

(52) U.S. Cl.
CPC .......... *G06F 30/398* (2020.01); *G06F 30/394* (2020.01)

(58) Field of Classification Search
CPC ...... G06F 30/30; G06F 30/34; G06F 2119/12; G06F 15/7867; G06F 30/323; G06F 30/39; G06F 30/00; G06F 9/5072; G06F 3/0629; G06F 12/0646; G06F 30/331; G06F 30/347; G06F 15/7807; G06F 15/7825; G06F 2117/04; G06F 30/398; G06F 13/16; G06F 13/4068; G06F 30/394; H01L 23/528; H01L 2224/4824; H01L 2225/0651;
(Continued)

(56) References Cited

U.S. PATENT DOCUMENTS

2007/0164785 A1* 7/2007 He ........................ G06F 30/34
326/41
2009/0254874 A1* 10/2009 Bose ...................... G06F 30/39
716/113
2013/0305199 A1* 11/2013 He ....................... G06F 30/327
716/104

* cited by examiner

*Primary Examiner* — Binh C Tat
(74) *Attorney, Agent, or Firm* — Jose Cherson Weissbrot

(57) ABSTRACT

A multi-stage FPGA routing method for optimizing time division multiplexing comprises the following steps: S1: collecting an FPGA set, an FPGA connection pair set, a net set and a net group set; S2: acquiring a routing topology of each net according to the FPGA set, the FPGA connection pair set, the net set and the net group set under the condition where TRs are not assigned; S3: assigning a corresponding TR to each edge of each net according to different delay of each net group; and S4: performing TR reduction and edge validation cyclically, iteratively optimizing net groups with TR being greater than a preset value until iteration end conditions are met, so as to obtain an optimal routing result. The multi-stage FPGA routing method may optimize the delay of inter-chip signals of a multi-FPGA prototype system and guarantee the routability of the multi-FPGA prototype system.

8 Claims, 7 Drawing Sheets

(58) Field of Classification Search
CPC . H01L 2924/15311; H01L 2225/06527; H01L 21/76886; H01L 21/768
USPC .................................................. 716/108–115
See application file for complete search history.

MULTI-STAGE FPGA ROUTING METHOD FOR OPTIMIZING TIME DIVISION MULTIPLEXING

BACKGROUND OF THE INVENTION

1. Technical Field

The invention belongs to the technical field of computer-aided design of integrated circuits and particularly relates to a multi-stage FPGA routing method for optimizing time division multiplexing.

2. Description of Related Art

Logic verification is an important step in advanced nano-fabrication. In the design process of SoC, it is estimated that 60%-80% of the time is spent on verification in the design of application-specific integrated circuits (ASIC). Software simulation and hardware emulation are two common logic verification methods. However, when software simulation is used for logic verification, it takes a large amount of time and cost to simulate each logic gate, and the cost of implementing hardware simulation is high. With the continuous development of the fabrication of integrated circuits, the scale of chips is becoming ever larger, and the disadvantages of these two logic verification methods are increasingly prominent.

In recent years, the field programmable gate array (FPGA) has been widely used in various fields, including machine learning, cloud computing, and prototype systems. Compared with traditional logic verification methods, an FPGA prototyping system makes logic verification cheaper and faster, thus having been widely used in industries. Although the scale of FPGA chips is constantly increasing, it is difficult for prototyping systems to be designed in one FPGA. Therefore, the FPGA prototype system typically consists of multiple FPGAs, and the multiple FPGAs are connected to form the entire multi-FPGA prototyping system.

To fulfill logic verification of a chip design through the multi-FPGA prototype system, a complete circuit is divided into multiple sub-circuits first, and each sub-circuit is configured in one FPGA. Due to the fact that the number of FPGA pins is often greater than that of FPGA inter-chip signals, time division multiplexing is used to transmit multiple inter-chip signals simultaneously within one system clock period (SCP) to improve the routability of the entire system, but the delay of the inter-chip signals is increased. The optimization of time division multiplexing is an important task in the design of the multi-FPGA prototype system.

BRIEF SUMMARY OF THE INVENTION

In view of this, the objective of the invention is to provide a multi-stage FPGA routing method for optimizing time division multiplexing to realize the optimization of time division multiplexing.

To fulfill the above objective, the invention adopts the following technical solution:

A multi-stage FPGA routing method for optimizing time division multiplexing comprises the following steps:
S1: collecting an FPGA set, an FPGA connection pair set, a net set and a net group set;
S2: acquiring a routing topology of each net according to the FPGA set, the FPGA connection pair set, the net set and the net group set under the condition where TRs are not assigned;
S3: assigning a corresponding TR to each edge of each net according to different delay of each net group; and
S4: performing TR reduction and edge validation cyclically, iteratively optimizing net groups with TR being greater than a preset value until iteration end conditions are met, so as to obtain an optimal routing result.

Further, S2 specifically comprises:
S21: preprocessing nets and sorting all the nets based on preset standards;
S22: establishing a routing solution of a current net based on the FPGA connection pair set and the FPGA set in input data, marking FPGAs to be routed, and marking the cost of each FPGA connection pair;
S23: completing routing of the current net through an approximate Steiner tree algorithm based on the routing graph of the current net to construct a Steiner tree to link the FPGAs to be routed;
S24: recording a routing topology of the current net;
S25: updating the cost of each FPGA connection pair by adding 1 to the cost of the FPGA connection pair selected by the current net to connect the FPGAs;
S26: repeating S22-S25 until routing of all the nets is completed to obtain the routing topology of each net.

Further, the preset standards are specifically that all the net groups are sorted in a decreasing order according to the number of nets and the nets in each net group are sorted in decreasing order according to the number of FPGAs.

Further, S3 specifically comprises:
S31: preprocessing each net group and calculating the number $ngec_{j,m}$ of edges of each net group $ng_{j,m}$ required for assigning a TR to each edge;
S32: calculating a weight ratio $pct_{j,k}$ of each edge $e_{j,k}$ using a current FPGA connection pair;
S33: sorting all the edges in an increasing order according to the weight ratio calculated in S32;
S34: initializing a parameter remain to 0;
S35: calculating a TR of a current edge;
S36: updating remain;
S37: recording the TR of the current edge;
S38: repeating S35-S37 until all the edges are processed; and
S39: repeating S32-S38 until all the connection pairs are processed, to complete TR assignment.

Further, S32 specifically comprises:
Calculating the weight ratio of each edge $e_{j,k}$ is as follows:

$$pct_{j,k} = \frac{ngmec_{j,k}}{\sum_{e_{o,k} \in el_k} nmec_{o,k}}$$

$$ngmec_{j,k} = \{x | x = \max(ngec_{j,1}, \ldots, ngec_{j,\beta})\}$$

Wherein, $ng_{j,m}$ is an $m^{th}$ net group in $ngl_j$, $ngec_{j,m}$ is the number of edges of the net group $ng_{j,m}$, $ngmec_{j,k}$ is the number of edges of the net group with a maximum number of edges $e_{j,k}$, $\beta$ is the number of net groups in $ngl_j$, and $pct_{j,k}$ is the weight ratio.

Further, S35 specifically comprises: calculating the TR of each edge $etr_{j,k}$ as follows:

$$etr_{j,k} = \frac{1}{pct_{j,k} + \text{remain}}$$

Further, S36 specifically comprises: updating remain according to the following formula:

$$remain = pct_{j,k} + remain - 1/etr_{j,k},$$

Further, the TR reduction specifically comprises:
(1) selecting a standard $TR_{statictr}$;
(2) before this step, determining whether the $TR_{ngtr_i}$ of the current net group is less than or equal to the standard $TR_{statictr}$; if $TR_{ngtr_i}$ is less than or equal to $TR_{statictr}$, skipping processing of the current net group; otherwise, performing this step to initialize a parameter totalLimit to 0, wherein totalLimit represents a value by which the TR of the current net group is to be reduced;
(3) calculating a parameter curLimit of each of all edges of all nets in the current net group, and updating totalLimit, wherein curLimit represents a value by which the TR of each edge is to be reduced;
(4) before this step, determining whether totalLimit is 0; if totalLimit is 0, skipping subsequent processing of the current net group; otherwise, calculating a value totalReduce by which the TR of the current net group is actually to be reduced;
(5) reducing the TR of each edge, and updating the TR of the net group including the edge; and
(6) repeating (2)-(5) until all the net groups are processed.

Further, the edge validation specifically comprises:
(1) before validating each FPGA connection pair, calculating a $TR_{ngmtr}$ of a current maximum net group;
(2) calculating a sum totalpct of TR reciprocals of all edges of a current FPGA connection pair, and determining whether totalpct is less than or equal to 1; if totalpct is less than or equal to 1, determining that the current FPGA connection pair meets a TR constraint, and then skipping processing of the current FPGA connection pair; otherwise, determining that the current FPGA connection pair does not meet the TR constraint, and performing the following steps for subsequent validation;
(3) increasing the TR of each edge without increasing the $TR_{ngmtr}$ of the current largest net group, and updating totalpct of the current FPGA connection pair; if totalpct is less than or equal to 1, determining that the current FPGA connection pair meets a TR constraint, and then skipping processing of the current FPGA connection pair; otherwise, determining that the FPGA connection pair does not meet the TR constraint, and performing following steps for subsequent validation;
(4) accumulatively adding 2 to the RT of each edge until the TR reciprocal of the edge is increased within a machine precision range;
(5) updating totalpct of the current FPGA connection pair; if totalpct is less than or equal to 1, determining that the current FPGA connection pair meets the TR constraint, and then skipping processing of the current FPGA; otherwise, determining that the current FPGA does not meet the TR constraint, performing (4) again until the current FPGA meets the TR constraint, that is, totalpct is less than or equal to 1; and
(6) repeating (2) to (5) until all the connection pairs are processed.

Compared with the prior art, the invention has the following beneficial effects:
1. The invention adopts a time division multiplexing ratio assignment method, thus effectively optimizing the delay of FPGA inter-chip signals;
2. The invention adopts a system clock period optimization method, thus effectively optimizing the serious delay of inter-chip signals;
3. An initial routing framework constructed in the invention may effectively guarantee the routability of an FPGA prototype system.

DETAILED DESCRIPTION OF THE INVENTION

The invention will be further explained below in conjunction with the accompanying drawings and embodiments.

Figure 2:
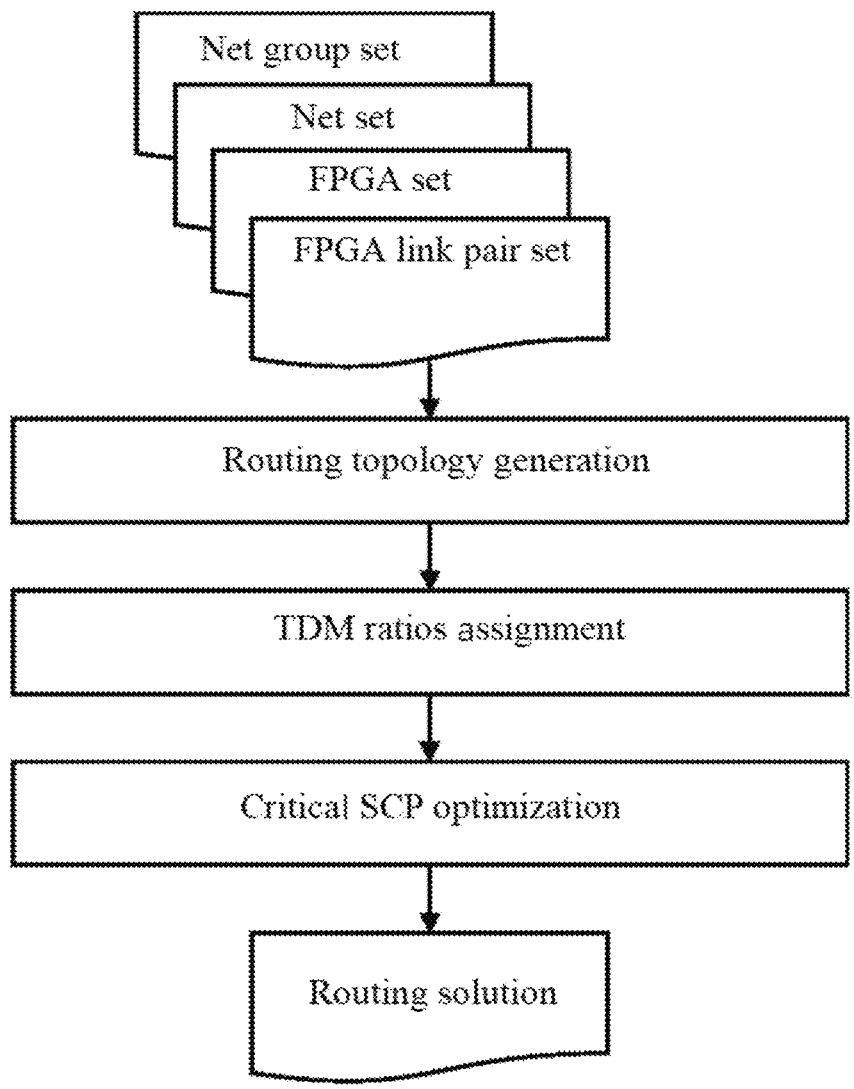
FIG. 2 is an overall flow diagram of a routing method of the invention.

Referring to FIG. 2, the invention provides a multi-stage FPGA routing method for optimizing time division multiplexing, comprising the following steps:
S1: an FPGA set, an FPGA connection pair set, a net set and a net group set are collected;
S2: a routing topology of each net is acquired according to the FPGA set, the FPGA connection pair set, the net set and the net group set under the condition where TRs are not assigned;
S3: a corresponding TR is assigned to each edge of each net according to different delay of each net group; and
S4: TR reduction and edge validation are performed cyclically, net groups with TR being greater than a preset value are iteratively optimized until iteration end conditions are met, so as to obtain an optimal routing result.

Figure 1:
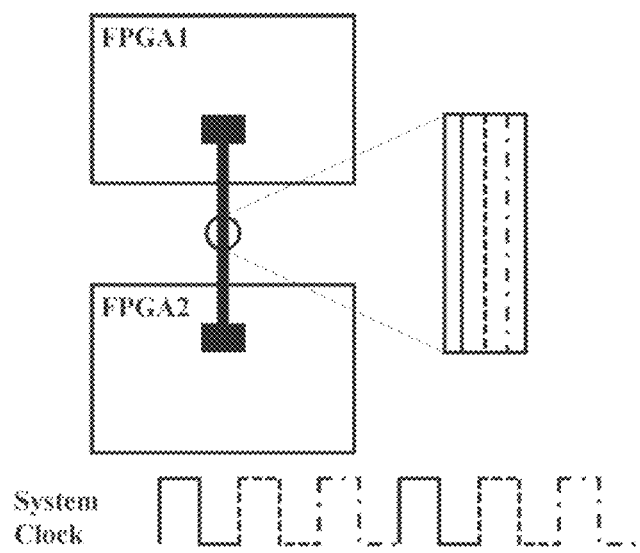
FIG. 1 is a schematic diagram of time division multiplexing in one embodiment of the invention.

In this embodiment, time division multiplexing is shown in FIG. 1, and each metal wire transmits only one signal within each SCP. By means of time division multiplexing, multiple signals may be transmitted at different times within one SCP. FIG. 1 illustrates a simplified diagram of time division multiplexing used between two FPGAs. Wherein the big boxes represent the FPGAs, the rectangles in the big boxes represent modules to be routed in the two FPGAs. The thick segment between the modules represents a unique metal wire between the two modules. In FIG. 1, different segments represent three different signals. By means of time division multiplexing, the three signals may be transmitted at different times within one SCP by means of one metal wire. The use of SCP is shown by the waveform in FIG. 1, and different segments represent different signals.

In this embodiment, an inter-chip FPGA routing problem model is specifically as follows: a net set N consisting of two or more FPGA nets is given. A net group set NG is given, and each net group belongs to the net group set NG, that is, $ng_i \in NG$. An FPGA connection pair set P is given, and each FPGA connection pair $p_k$ connects two FPGAs. An FPGA set F is given, and there is at most one FPGA connection pair between every two FPGAs. Each net $n_j$ may belong to different net groups, and the net groups include sub-sets $ngl_j \subseteq NG$.

The basic requirement of an inter-chip FPGA routing problem is to route all the FPGAs of each net through FPGA connection pairs. In addition, an edge $e_{j,k}$ generated by each FPGA connection pair used by each net $n_j$ is assigned with a value TR. As required by the actual problem, the TR meets the following requirement:

$$\sum_{e_{j,k} \in el_k} \frac{1}{etr_{j,k}} \leq 1 \quad (1)$$

$$etr_{j,k} \in \{x | x = 2 \times y, y \in N^*, 2 \leq x \leq 4294967296\} \quad (2)$$

Wherein, $etr_{j,k}$ is the TR of the edge $e_{j,k}$, and $el_k$ is a set of edges using the FPGA connection pair $p_k$. To meet the implementation requirement of multiplexing hard-wiring, the TR is an even number.

The system clock period is a time of arrival from a source point to a meeting point. When one net uses an FPGA connection pair, the TR assigned to the connection pair is the system clock period of the edge. The maximum system clock period is an evaluation criterion that has a significant influence on the delay of a system. Due to the presence of net groups, a net group with the maximum system clock period determines the delay of the entire system. Meanwhile, since the TR reflects the duration of the system clock period, the optimization objective of the invention is to minimize the maximum TR of the net groups.

The TR of each net $n_j$ and the TR of each net group $ng_i$ are defined as follows:

$$ntr_j = \sum_{e_{j,k} \in el_j} etr_{j,k} \quad (3)$$

$$ngtr_i = \sum_{n_j \in nl_i} ntr_j \quad (4)$$

Wherein, $el_j$ is a set of edges belonging to the net $n_j$, $nl_i$ is a set of nets belonging to the net group $ng_i$, $ntr_j$ is the TR of the net $n_j$, and $ngtr_i$ is the TR of the net group $ng_i$.

So, the optimization objective of the invention is defined as follows:

Minimize:$ngmtr = \{x | x = \max(ngtr_1, \ldots, ngtr_\alpha)\}$ (5)

Wherein, $\alpha$ is the number of all net groups, and ngmtr is the maximum TR of the net groups.

Figure 3:
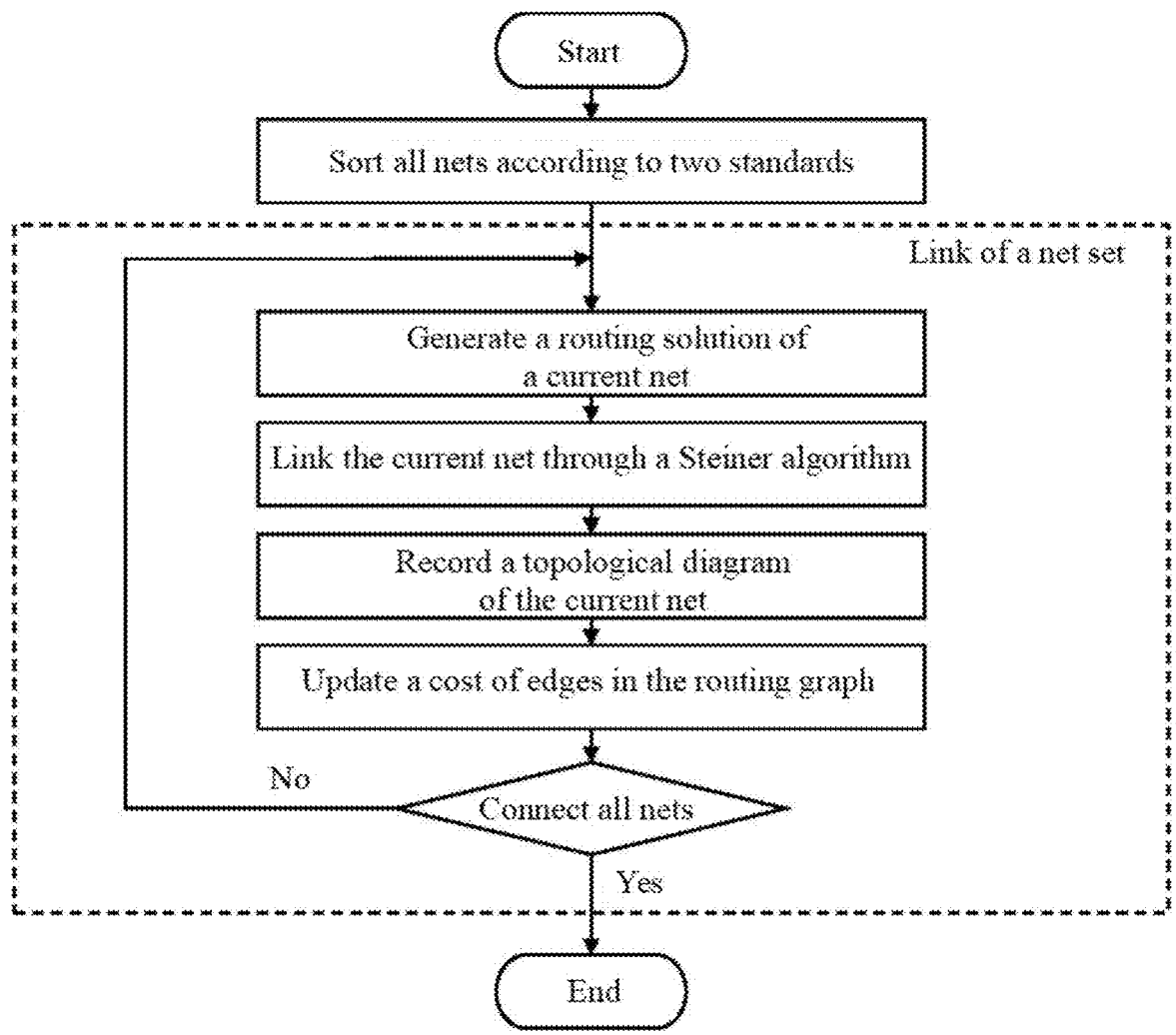
FIG. 3 is a flow diagram of routing topology generation in one embodiment of the invention.

In this embodiment, as shown in FIG. 3, routing topology generation comprises five steps. In the first step, all nets are preprocessed and sorted; and from the second step to the fifth step, the entire net set is processed, and the FPGAs of one net are routed in each cycle until the routing topologies of all the nets are determined.

First step: before routing each net, all the nets are sorted in terms of two standards. First, because a serious delay is more likely to happen to a net group with more nets, all the net groups are sorted in decreasing order according to the number of nets. Second, because routing of a net with more FPGAs is more difficult, all the nets in each net group are sorted in decreasing order according to the number of FPGAs. Finally, all the nets are extracted in order.

Second step: a routing solution of a current net is established based on the FPGA connection pair set and the FPGA set in input data, FPGAs to be routed are marked, and the cost of each FPGA connection pair is marked. The cost of each FPGA connection pair is initialized to 1 before the first cycle and is updated according to the fifth step after the routing of one net is completed.

Third step: routing of the current net is completed based on the routing graph of the current net through a faster approximation Steiner tree algorithm (K. Mehlhorn, "A faster approximation algorithm for the Steiner problem in graphs," Information Processing Letters, vol. 27, no. 3, pp. 125-128, 1988.) to construct a Steiner tree to link the FPGAs to be routed. It should be noted that any Steiner tree algorithm may be applied to a router designed by the invention, so that the flexibility of the router is improved.

Fourth step: a routing topology of the current net is recorded.

Fifth step: the cost of each FPGA connection pair is updated, that is, the cost of the FPGA connection pair selected by the current net to link the FPGAs is added by 1.

Figure 4:
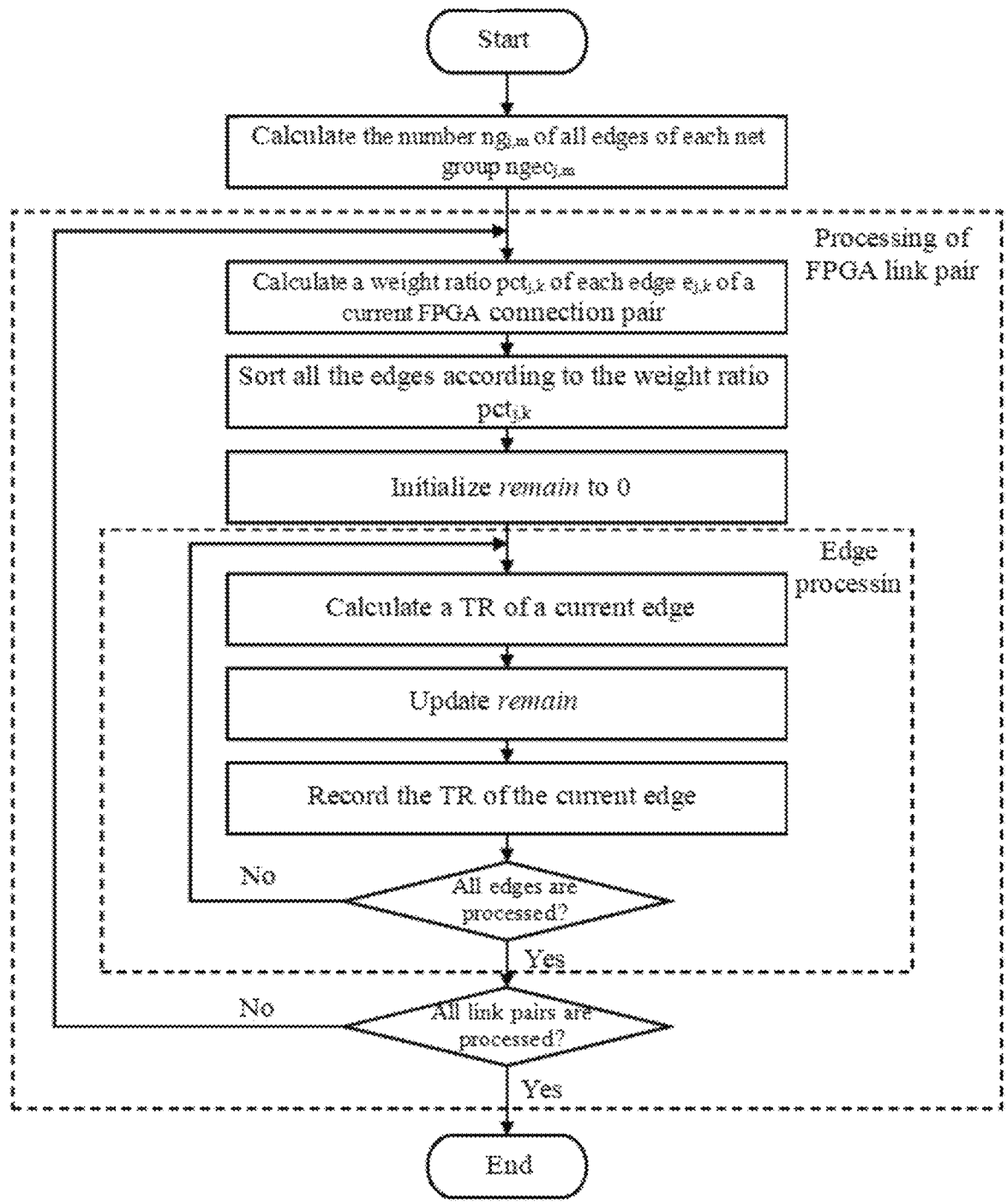
FIG. 4 is a flow diagram of TR assignment in one embodiment of the invention.

In this embodiment, an effective TR assignment method is designed to properly assign a TR to each edge of each net. As shown in FIG. 4, which illustrates a flow diagram of the TR assignment, the TR assignment comprises seven steps in total. From the second step to the seventh step, the entire FPGA connection pair set is processed cyclically, and in each cycle, TRs are assigned to edges using the current FPGA connection pair until all the FPGA connection pairs are processed. From the fifth step to the seventh step, an edge set using the current FPGA connection pair is processed cyclically, and in each cycle, a TR is assigned to the current edge until all the edges are processed.

In order to assign a proper TR to each net, it is necessary to take into consideration a TR constraint for each FPGA connection pair. According to the optimization objective, the degree of delay of each edge is associated with the net group to which the edge belongs. In addition, the degree of delay of each edge is also associated with the number of edges of the net group. In view of this, this embodiment provides a weight ratio calculation method. The weight ratio of each edge $e_{j,k}$ is as follows:

$$pct_{j,k} = \frac{ngmec_{j,k}}{\sum_{e_{o,k} \in el_k} nmec_{o,k}} \quad (6)$$

$$ngmec_{j,k} = \{x | x = \max(ngec_{j,1}, \ldots, ngec_{j,\beta})\} \quad (7)$$

Wherein, $ng_{j,m}$ is an $m^{th}$ net group in $ngl_j$, $ngec_{j,m}$ is the number of edges of the net group $ng_{j,m}$, $ngmec_{j,k}$ is the number of edges of the net group with a maximum number of edges $e_{j,k}$, $\beta$ is the number of net groups in $ngl_j$ and $pct_{j,k}$ is the weight ratio. Based on the weight ratio, the TR of the edge is calculated as follows:

$$etr_{j,k} = \frac{1}{pct_{j,k}} \quad (8)$$

First step: each net group is preprocessed, and the number $ngec_{j,m}$ of edges of each net group $ng_{j,m}$ required for assigning a TR to each edge is calculated.

Second step: the weight ratio $pct_{j,k}$ of each edge $e_{j,k}$ using a current FPGA is calculated according to formula (6).

Third step: all the edges using the current FPGA are sorted in an increasing order according to the weight ratio.

Fourth step: a parameter remain is initialized to 0. Due to the fact that the machine precision is limited, an error caused by the limited machine precision needs to be taken into consideration during TR calculation. remain is a total error generated by calculation before each cycle.

Fifth step: the TR of a current edge is calculated. Considering the limited machine precision, the TR of each edge $etr_{j,k}$ is actually calculated as follows:

$$etr_{j,k} = \frac{1}{pct_{j,k} + \text{remain}} \quad (9)$$

Sixth step: remain is updated to record the error generated by the calculation in the fifth step. remain is updated according to the following formula:

$$\text{remain} = pct_{j,k} + \text{remain} - 1etr_{j,k} \quad (10)$$

Seventh step: the TR of the current edge is recorded.

Figure 5:
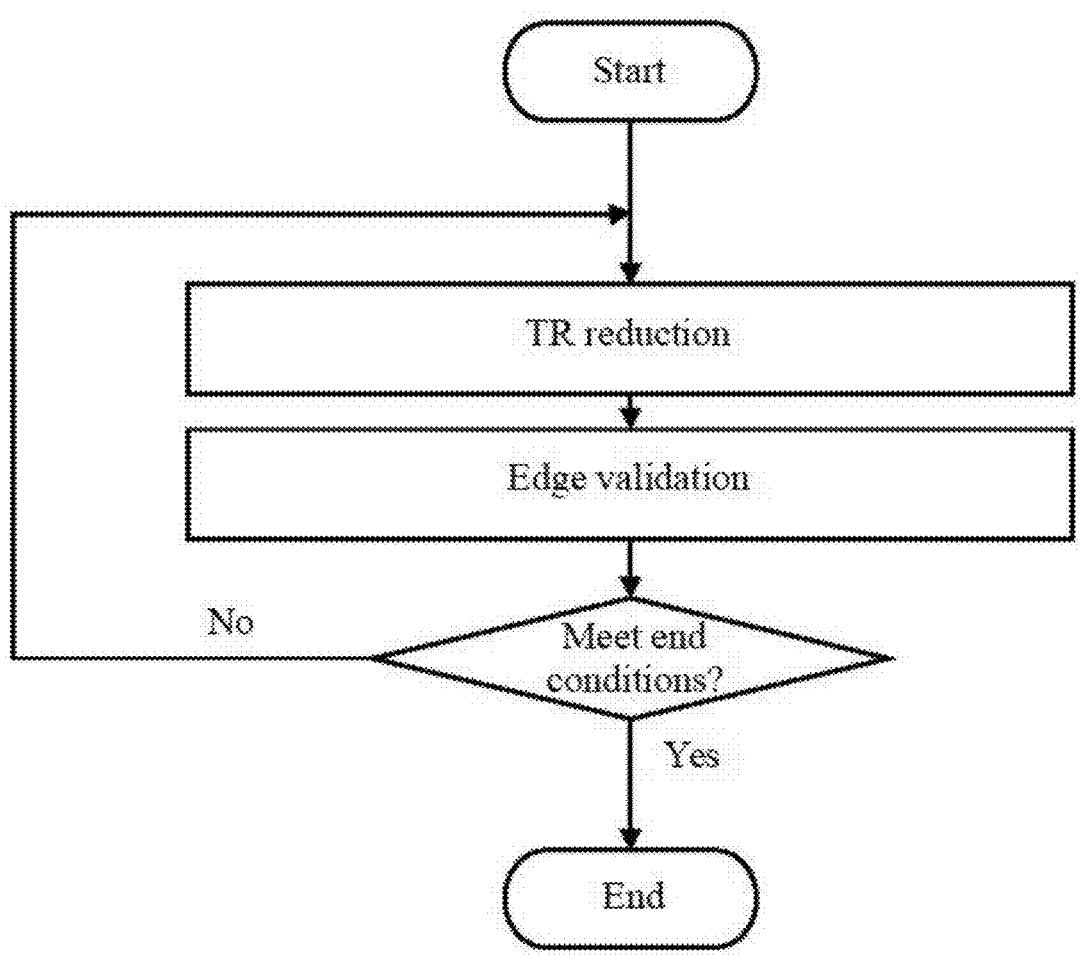
FIG. 5 is an overall flow diagram of key SCP optimization in one embodiment of the invention.

In this embodiment, in the TR assignment stage, an initial TR is assigned to each edge. Due to the fact that the evaluation criterion of the delay is the number of edges of the net groups and is not completely consistent with the actual condition, the TR needs to be further optimized. As shown in FIG. 5, which illustrates a flow diagram of a method for optimizing the TR of a maximum net group, the method comprises a step of TR reduction and a step of edge validation sequentially. The two steps of the method are performed cyclically until end conditions are met. In this embodiment, three end conditions are given: the number of iterations should not be over 10; the runtime should not be over 1000 s; the number of net groups to be optimized should not be over half of the total number of the net groups. It should be noted that the end conditions may be adjusted randomly by users as actually needed.

Figure 6:
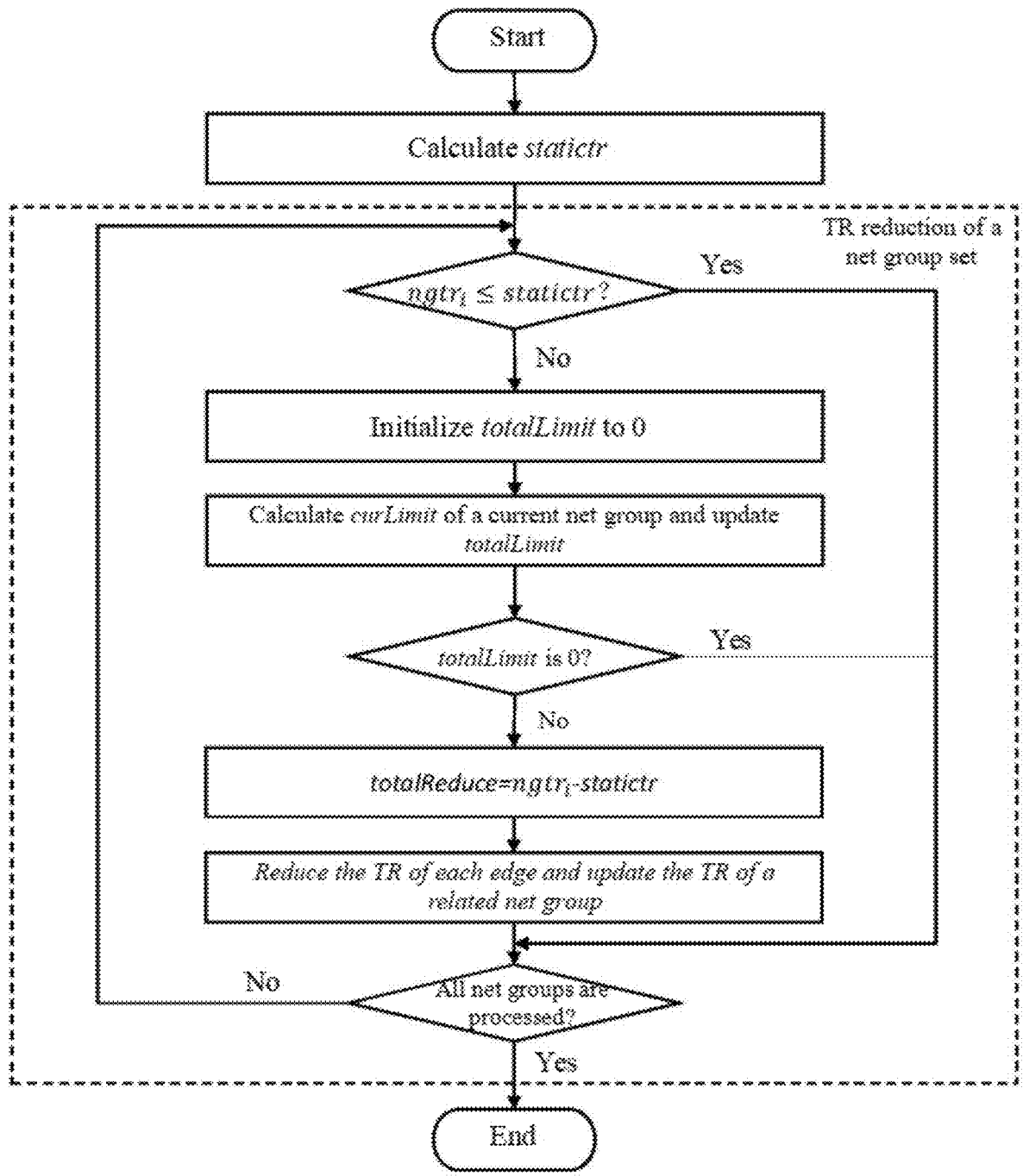
FIG. 6 is a flow diagram of TR reduction in one embodiment of the invention.

The process of the first step of key CSP optimization, the process of TR reduction, is shown in FIG. 6. This process comprises five steps. From the second step to the fifth step, the entire net group set is processed cyclically, and in each cycle, the TR of the current net group is reduced until all net groups are processed.

First step of TR reduction: a standard TR (statictr) is selected. In this embodiment, the section condition is as follows: if a difference between the TR of the second largest net group and the TR of the largest net group is greater than a threshold, the standard TR is the TR of the second largest net group; or, if the difference is not greater than the threshold, the standard TR is a difference between the TR of the largest net group and the threshold. The threshold may be set according to the actual condition. It should be noted that the selection of the threshold determines the degree of each iterative optimization.

Second step of TR reduction: before this step, whether $TR(ngtr_j)$ of the current net group is less than or equal to the standard TR(statictr) is determined first; if $ngtr_j$ is less than or equal to statictr, processing of the current net group is skipped; otherwise, this step is performed to initialize totalLimit to 0, wherein totalLimit represents a value by which the TR of the current net group is to be reduced.

Third step of TR reduction, a parameter curLimit of all edges of all nets in the current net groups is calculated, and totalLimit is updated, wherein totalLimit represents a value by which the TR of each edge is to be reduced. The parameter curLimit of each edge $e_{j,k}$ is calculated as follows:

$$\text{curLimit}_{j,k} = mngtr_j - mngtr_o \quad (11)$$

Wherein, $mng_j$ is the net group with the maximum TR in $ngl_j$, $mngtr_j$ is the TR of $mng_j$, $mngtr_o$ is the TR of the net group $mng_o$ to which the edge $e_{o,k}$ sharing the same FPGA connection pair with $e_{j,k}$ belongs, and $etr_{o,k}$ is greater than $etr_{j,k}$ in the connection pair and has a smallest difference with $etr_{j,k}$.

Fourth step of TR reduction: before this step, whether totalLimit is 0 is determined; if totalLimit is 0, subsequent processing of the net group is skipped; otherwise, this step is performed to calculate a value totalReduce by which the TR of the current net groups is actually to be reduced, as shown in FIG. 6.

Fifth step of TR reduction: the TR of each edge is reduced, and the TR of the net group including the edge is updated. The TR of each edge is updated according to the following formula:

$$etr_{j,k} = etr_{j,k} - \text{curLimit}_{j,k} \times \text{total Reduce/totalLimit} \quad (12)$$

Figure 7:
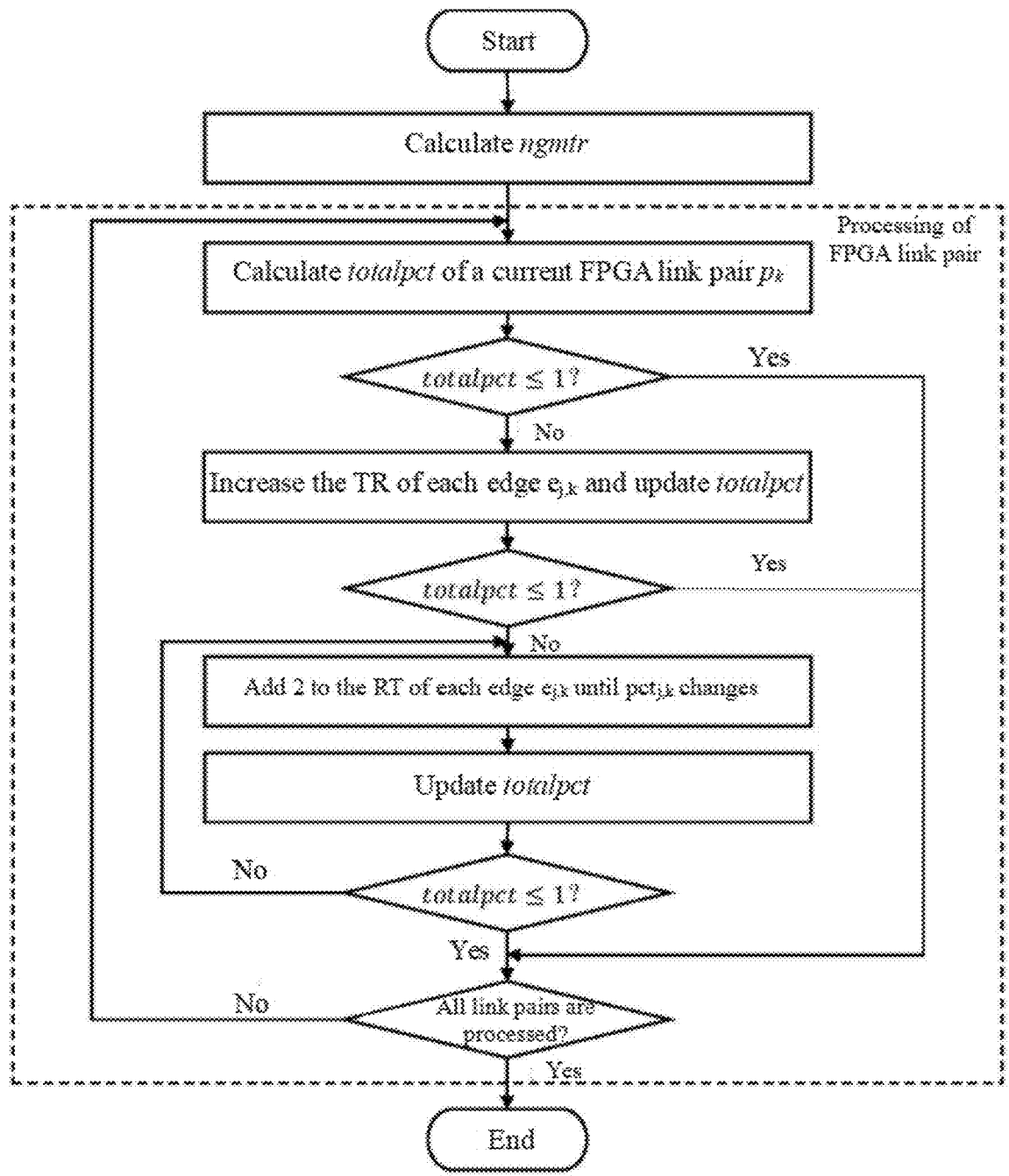
FIG. 7 is a flow diagram of edge validation in one embodiment of the invention.

The process of the second step of the key SCP optimization, namely the process of edge validation, is shown in FIG. 7. This process is used to guarantee that a result of TR reduction meets a TR constraint. Different from the step of TR reduction, each FPGA connection pair rather than each net group is processed in this step. The process of edge validation comprises five steps in total. From the second step to the fifth step, the entire FPGA connection pair set is processed cyclically, and in each cycle, the current FPGA connection pair is validated until all the FPGA connection pairs are processed.

First step of edge validation: before each FPGA connection pair is validated, the TR (ngmtr) of the current largest net group is calculated.

Second step of edge validation: a sum totalpct of TR reciprocals of all edges of the current FPGA connection pair is calculated, and whether totalpct is less than or equal to 1 is determined; if totalpct is less than or equal to 1, it is determined that the current FPGA connection pair meets the TR constraint, and then processing of the current FPGA connection pair is skipped; otherwise, it is determined that the current FPGA connection pair does not meet the TR constraint, and the following steps are performed for subsequent validation.

Third step of edge validation: the TR of the edge is increased without increasing the $TR_{ngmtr}$ of the current largest net group, and totalpct of the current FPGA connection pair is updated; if totalpct is less than or equal to 1, it is determined that the current FPGA connection pair meets the TR constraint, and then processing of the current FPGA connection pair is skipped; otherwise, it is determined that the FPGA connection pair does not meet the TR constraint, and following steps are performed for subsequent validation.

Fourth step of edge validation: 2 is accumulatively added to the RT of each edge until a TR reciprocal of the edge is increased within a machine precision range.

Fifth step of edge validation: totalpct of the current FPGA connection pair is updated; if totalpct is less than or equal to 1, it is determined that the current FPGA connection pair meets the TR constraint, and then processing of the current FPGA is skipped; otherwise, it is determined that the current FPGA does not meet the TR constraint, the fifth sub-step of edge validation is performed again until the current FPGA meets the TR constraint, that is, totalpct is less than or equal to 1

In this embodiment, a multi-stage FPGA router for optimizing time division multiplexing is constructed correspondingly according to the method of the invention. Preferably, to further improve the operating efficiency of the router, the router may perform two steps in parallel in a multi-threaded manner. The first step is the generation of a routing topology. Due to the fact that nets are independent of each other, the second, third, fourth, and fifth steps are shown in FIG. 3, which may be cyclically performed in parallel in a multi-threaded manner. However, the fifth step needs to be locked during resource competition to avoid an error. The second step is TR assignment. The second, third, fourth, fifth, sixth, and seventh steps shown in FIG. 4 may be cyclically performed in parallel in a multi-threaded manner. A method based on the router processes each FPGA connection pair independently, so that all FPGA connection pairs are in parallel without being locked.

The above embodiments of the invention are merely preferred ones of the invention, and all equivalent variations and modifications made according to the patent scope of the invention should fall within the scope of the invention.

What is claimed is:

1. A multi-stage FPGA routing method for optimizing time division multiplexing, comprises the following steps:
    S1: collecting an FPGA set, an FPGA connection pair set, a net set and a net group set;
    S2: acquiring a routing topology of each net according to the FPGA set, the FPGA connection pair set, the net set, and the net group set under the condition where TRs are not assigned;
    S3: assigning a corresponding TR to each edge of each net according to different delay of each net group; and
    S4: performing TR reduction and edge validation cyclically, iteratively optimizing net groups with TR being greater than a preset value until iteration end conditions are met, so as to obtain an optimal routing result;
    S3 specifically comprises:
    S31: preprocessing each net group and calculating the number $ngec_{j,m}$ of edges of each net group $ng_{j,m}$ required for assigning a TR to each edge;
    S32: calculating a weight ratio $pct_{j,k}$ of each edge $e_{j,k}$ using a current FPGA connection pair;
    S33: sorting all the edges in an increasing order according to the weight ratio calculated in S32;
    S34: initializing a parameter remain to 0;
    S35: calculating a TR of a current edge;
    S36: updating remain;
    S37: recording the TR of the current edge;
    S38: repeating S35-S37 until all the edges are processed; and
    S39: repeating S32-S38 until all the connection pairs are processed, to complete TR assignment.

2. He multi-stage FPGA routing method for optimizing time division multiplexing according to claim 1, wherein S2 specifically comprises:
    S21: preprocessing nets and sorting all the nets based on preset standards;
    S22: establishing a routing solution of a current net based on the FPGA connection pair set and the FPGA set in input data, marking FPGAs to be routed, and marking the cost of each FPGA connection pair;
    S23: completing routing of the current net through an approximate Steiner tree algorithm based on the routing graph of the current net to construct a Steiner tree to link the FPGAs to be routed;
    S24: recording a routing topology of the current net;
    S25: updating the cost of each FPGA connection pair by adding 1 to the cost of the FPGA connection pair selected by the current net to link the FPGAs; and
    S26: repeating S22-S25 until routing of all the nets is completed to obtain the routing topology of each net.

3. The multi-stage FPGA routing method for optimizing time division multiplexing according to claim 2, wherein the preset standards are specifically that all the net groups are sorted in a decreasing order according to the number of nets, and the nets in each net group are sorted in a decreasing order according to the number of FPGAs.

4. The multi-stage FPGA routing method for optimizing time division multiplexing according to claim 1, wherein S32 specifically comprises:
    calculating the weight ratio of each edge $e_{j,k}$ as follows:

$$pct_{j,k} = \frac{ngmec_{j,k}}{\sum_{e_{o,k} \in el_k} nmec_{o,k}}$$

$$ngmec_{j,k} = \{x | x = \max(ngec_{j,1}, \ldots, ngec_{j,\beta})\}$$

wherein, $ng_{j,m}$ is an $m^{th}$ net group in $ngl_j$, $ngec_{j,m}$ is the number of edges of the net group $ng_{j,m}$, $ngmec_{j,k}$ is the number of edges of the net group with a maximum number of edges $e_{j,k}$, $\beta$ is the number of net groups in $ngl_j$, and $pct_{j,k}$ is the weight ratio.

5. The multi-stage FPGA routing method for optimizing time division multiplexing according to claim 1, wherein S35 specifically comprises: calculating the TR of each edge $etr_{j,k}$ as follows:

$$etr_{j,k} = \frac{1}{pct_{j,k} + \text{remain}}.$$

6. The multi-stage FPGA routing method for optimizing time division multiplexing according to claim 1, wherein S36 specifically comprises: updating remain according to the following formula:

remain=$pct_{j,k}$+remain−1/$etr_{j,k}$.

7. The multi-stage FPGA routing method for optimizing time division multiplexing according to claim 1, wherein the TR reduction specifically comprises:
    (1) selecting a standard $TR_{statictr}$;
    (2) before this step, determining whether the $TR_{ngtr_i}$ of the current net group is less than or equal to the standard $TR_{statictr}$; if $TR_{ngtr_i}$ is less than or equal to $TR_{statictr}$, skipping processing of the current net group; otherwise, performing this step to initialize a parameter totalLimit to 0, wherein totalLimit represents a value by which the TR of the current net group is to be reduced;
    (3) calculating a parameter curLimit of each of all edges of all nets in the current net group, and updating totalLimit, wherein curLimit represents a value by which the TR of each edge is to be reduced;
    (4) before this step, determining whether totalLimit is 0; if totalLimit is 0, skipping subsequent processing of the current net group; otherwise, calculating a value totalReduce by which the TR of the current net group is actually to be reduced;
    (5) reducing the TR of each edge, and updating the TR of the net group including the edge; and
    (6) repeating (2)-(5) until all the net groups are processed.

8. The multi-stage FPGA routing method for optimizing time division multiplexing according to claim 1, wherein the edge validation specifically comprises:

(1) before validating each FPGA connection pair, calculating a $TR_{ngmtr}$ of a current maximum net group;
(2) calculating a sum totalpct of TR reciprocals of all edges of a current FPGA connection pair, and determining whether totalpct is less than or equal to 1; if totalpct is less than or equal to 1, determining that the current FPGA connection pair meets a TR constraint, and then skipping processing of the current FPGA connection pair; otherwise, determining that the current FPGA connection pair does not meet the TR constraint, and performing the following steps for subsequent validation;
(3) increasing the TR of each edge without increasing the $TR_{ngmtr}$ of the current largest net group, and updating totalpct of the current FPGA connection pair; if totalpct is less than or equal to 1, determining that the current FPGA connection pair meets a TR constraint, and then skipping processing of the current FPGA connection pair; otherwise, determining that the FPGA connection pair does not meet the TR constraint, and performing following steps for subsequent validation;
(4) accumulatively adding 2 to the RT of each edge until the TR reciprocal of the edge is increased within a machine precision range;
(5) updating totalpct of the current FPGA connection pair; if totalpct is less than or equal to 1, determining that the current FPGA connection pair meets the TR constraint, and then skipping processing of the current FPGA; otherwise, determining that the current FPGA does not meet the TR constraint, performing (4) again until the current FPGA meets the TR constraint, that is, totalpct is less than or equal to 1; and
(6) repeating (2) to (5) until all the connection pairs are processed.

* * * * *